United States Patent
Peng et al.

(10) Patent No.: US 10,914,678 B2
(45) Date of Patent: Feb. 9, 2021

(54) METHOD FOR QUANTITATIVE DETECTION OF BLOOD LIPID CONTENT IN BLOOD BASED ON TERAHERTZ SPECTROSCOPY

(71) Applicant: University of Shanghai for Science and Technology, Shanghai (CN)

(72) Inventors: Yan Peng, Shanghai (CN); Yiming Zhu, Shanghai (CN); Liping Wang, Shanghai (CN); Qingrou Yang, Shanghai (CN); Jiayu Zhao, Shanghai (CN); Zhijia Liu, Shanghai (CN); Yang Liu, Shanghai (CN); Xinyu Tang, Shanghai (CN); Keying Liu, Shanghai (CN); Lin Guo, Shanghai (CN); Songlin Zhuang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 154 days.

(21) Appl. No.: 16/352,768

(22) Filed: Mar. 13, 2019

(65) Prior Publication Data
US 2020/0292448 A1    Sep. 17, 2020

(51) Int. Cl.
G01N 21/3586    (2014.01)
G01N 1/40    (2006.01)
G01N 21/3577    (2014.01)

(52) U.S. Cl.
CPC ....... *G01N 21/3586* (2013.01); *G01N 1/4077* (2013.01); *G01N 21/3577* (2013.01); *G01N 2001/4088* (2013.01)

(58) Field of Classification Search
CPC ............. G01N 21/3577; G01N 1/4077; G01N 2001/4088; G01N 21/3586
See application file for complete search history.

(56) References Cited

U.S. PATENT DOCUMENTS

2018/0246089 A1* 8/2018 Chou .................... B01L 3/5055

* cited by examiner

*Primary Examiner* — David P Porta
*Assistant Examiner* — Fani Boosalis
(74) *Attorney, Agent, or Firm* — Wayne & Ken, LLC; Tony Hom

(57) ABSTRACT

A method for quantitative detection of blood lipid in blood based on terahertz spectroscopy, including: matching the terahertz spectral absorption coefficient curves of blood samples obtained in step 3 with parameters of component concentration and component type of the blood lipid detected by hospital instruments, and establishing a terahertz blood lipid parameter database by combining the time-domain signal data of samples of the triglyceride and cholesterol; determining parameters of a support vector regression (SVR) model; performing a training with the training set as input to the SVR model to obtain a support vector and a corresponding weight; and testing the test set of an unknown blood sample using the trained support vector and the corresponding weight.

1 Claim, 1 Drawing Sheet

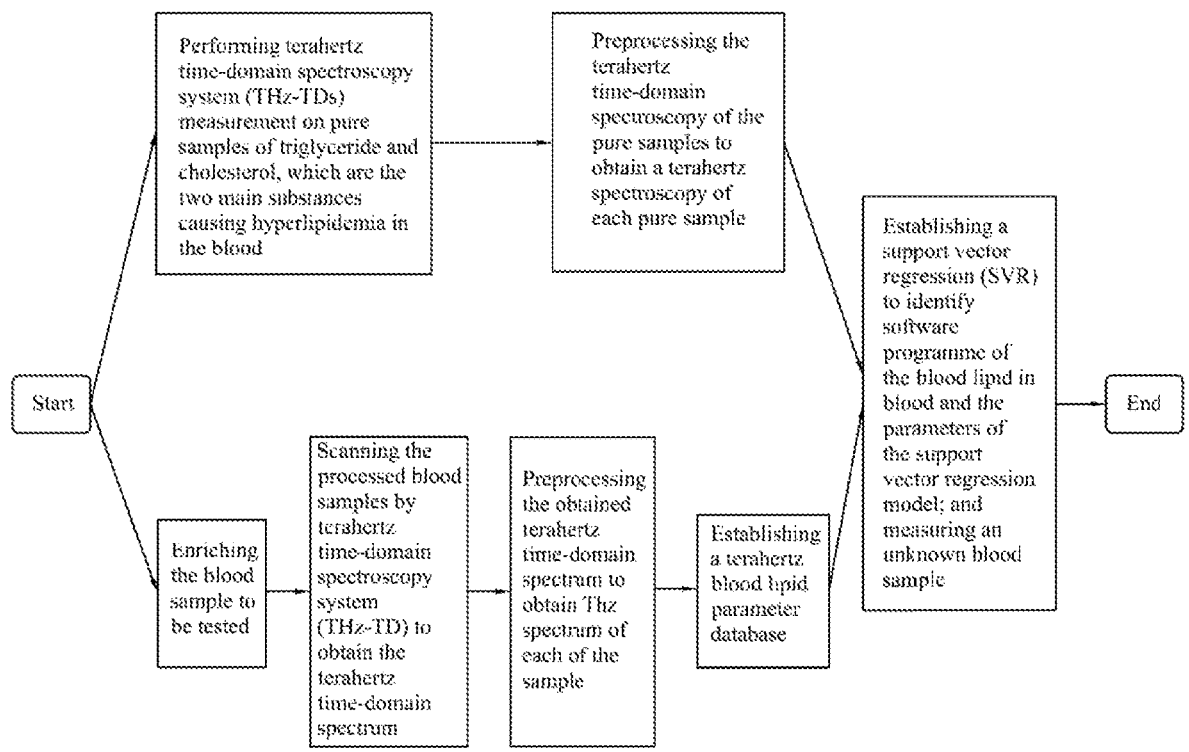

METHOD FOR QUANTITATIVE DETECTION OF BLOOD LIPID CONTENT IN BLOOD BASED ON TERAHERTZ SPECTROSCOPY

TECHNICAL FIELD

The present invention relates to application of terahertz spectroscopy, and in particular to a method for quantitative detection of blood lipid content in the blood based on terahertz spectroscopy.

BACKGROUND OF THE INVENTION

At present, the biochemical analyzer is commonly used for clinical testing of the blood lipid in hospitals, and substances being analyzed generally include cholesterol, triglyceride, etc. There are still some defects since chemical reagents need to be added in the process of analyzing blood lipid in hospital. First, the period for analysis is relatively long. For example, the "EXCELLENT 400/450 automatic biochemical analyzer" used by hospitals now has a speed of 400 tests per hour. For this kind of biochemical instruments, not only the chemical reactions but the addition and disposal of reagents are time-consuming. Second, the use of reagents increases the cost of testing Terahertz wave is an electromagnetic wave with a frequency ranging from 0.1 THz to 10 THz, and the wave band is between microwave and infrared. The terahertz wave is of a scientific significance and is applied to a wide range of applications. The terahertz wave is characterized by its safety because the energy of a terahertz photon is only about millivolt, and the measured substances will not be damaged by ionization. Such feature is extremely important in the applications such as security check of passengers and tissue biopsy of patients. The photon energy of the terahertz wave is basically the same with vibrational and rotational energy of the organic molecules. Therefore, the vibration and rotational transitions of organic molecules, the interaction between the molecules, and the lattice vibration are all in this band, which provides a new and effective way to study chemical structures and physical properties of substances.

The water content is about 91%-92% in the total blood plasma, and terahertz waves is strongly absorbed by water, causing terahertz cannot be directly used for detecting the spectral characteristics of blood plasma at present.

SUMMARY OF THE INVENTION

The present invention aims to solve the problem that the conventional biochemical analyzer is time-consuming and regents must be used. Therefore, the present invention provides a method for quantitative detection of blood lipid content in blood based on terahertz spectroscopy in which a support vector of blood lipid parameter and corresponding weight are established to achieve rapid detection of blood lipid content in the blood.

A method for quantitative detection of blood lipid content in the blood based on terahertz spectroscopy comprises the following steps:

step 1: sampling triglyceride and cholesterol, respectively; scanning samples by a terahertz time-domain spectroscopy system to obtain time-domain signal data of each sample;

step 2: enriching the lipid content in the blood samples obtained from a hospital, scanning the enriched samples by a terahertz time-domain spectroscopy system to obtain time-domain signal data of the blood samples;

step 3: preprocessing the time-domain signal data of the samples obtained in step 1 and step 2 to obtain a THz spectral absorption coefficient curve of the samples;

step 4: matching the terahertz spectral absorption coefficient curves of blood samples obtained in step with parameters of component concentration and component type of the blood lipid detected by hospital instruments, and establishing a terahertz blood lipid parameter database by combining the time-domain signal data of samples of the triglyceride and cholesterol obtained in step 1;

step 5: taking half of the data in the database as a training set and the other half of the data as a test set; determining parameters of a support vector regression (SVR) model; performing a training with the training set as input to the SVR model to obtain a support vector and a corresponding weight, i.e., a mapping relationship between a spectral line of the blood sample and the training set; testing the test set of an unknown blood sample using the trained support vector and the corresponding weight to obtain blood analysis results; and verifying accuracy of the trained support vector and the corresponding weight.

The present invention provides many beneficial effects. It overcomes the problems that the conventional method for testing the blood lipid with traditional biochemical analyzers is time-consuming and reagents are required. Also, the problem that the terahertz wave are absorbed by water to affect signal detection is avoided. The accuracy of the present invention of detecting blood lipid content in the blood is more than 99%. Therefore, the blood lipid content in the blood can be detected conveniently and effectively to facilitate the diagnosis by doctors and the treatment to patients.

BRIEF DESCRIPTION OF THE DRAWINGS

FIG. 1 is a flow diagram of the method of the present invention.

DETAILED DESCRIPTION OF EMBODIMENTS

As shown in FIG. 1, a flow diagram of a method for quantitative detection of lipid contents in the blood based on terahertz spectroscopy is illustrated. Specifically, the method is carried out as follows.

Step 1: The blood lipid content substances, triglyceride and cholesterol, are sampled respectively. The samples are scanned by a terahertz time-domain spectroscopy system to obtain time-domain signal data of each sample.

Triglyceride and cholesterol are selected as samples. Particles of pure triglyceride and cholesterol are respectively mixed with a certain amount of PE powder for tableting. The tablets are scanned by a THz-TDS system, and time-domain signal data of samples are obtained to establish characteristic spectrum parameter data in the subsequent procedure.

Step 2: The lipid contents in the blood samples obtained from a hospital are enriched. The enriched blood samples are scanned by a terahertz time-domain spectroscopy system to obtain time-domain signal data of the blood samples.

(a) The blood is enriched by centrifugation, filtration, purification, extraction, etc. to remove the water from the plasma to obtain a plasma sample that contains no water.

(b) The plasma samples are scanned by the THz-IDS system to obtain the time-domain signal data of the plasma samples.

Step 3: The time-domain signal data of the samples obtained in step 1 and step 2 are preprocessed to obtain a THz spectral absorption coefficient curve of the samples. The specific steps are as follows:

(a) Reflection peaks of the samples are removed according to reflection peak positions in the time-domain signal of samples.

(b) A fast Fourier transform is performed for the time-domain signal where the reflection peaks have been removed.

(c) The relative absorption coefficient of the samples are calculated according to Beer-Lambert-Bouguer Law, and the calculating formula is:

$$\alpha(w) = \ln \frac{I_{ref}(w)}{I_{sam}(w)}.$$

In the formula: $I_{ref}(w)$ is the transmission spectra of the reference signal, and $I_{sam}(w)$ is the transmission spectra of signal containing sample information.

(d) The absorption coefficient of the samples in an effective frequency domain range is intercepted. Only information for the samples is retained.

(e) Since the THz spectroscopy is subjected to baseline drift due to the influence of sample scattering, the orthogonal wavelet transform method is used to remove the low-frequency baseline and high-frequency noise of the THz spectroscopy.

Step 4: The terahertz spectral absorption coefficient curves of blood samples obtained in step 3 are matched with parameters of component concentration and component type of the blood lipid detected by hospital instruments. A terahertz blood lipid parameter database is established by combining the time-domain signal data of samples of the triglyceride and cholesterol obtained in step 1.

Step 5: Half of the data in the database are taken as a training set and the other half of the data are taken as a test set. Parameters of a support vector regression (SVR) model are determined.

A training is performed with the training set as input to the SVR model to obtain a support vector and a corresponding weight, i.e., a mapping relationship between a spectral line of the blood sample and the training set. The test set of an unknown blood sample is tested using the trained support vector and the corresponding weight to obtain blood analysis results. The accuracy of the trained support vector and the corresponding weight is verified.

What is claimed is:

1. A method for quantitative determination of blood lipid content in blood based on terahertz spectroscopy, comprising:

step 1: sampling triglyceride and cholesterol, respectively; scanning samples by a terahertz time-domain spectroscopy system to obtain time-domain signal data of each sample;

step 2: enriching the lipid content in the blood samples obtained from a hospital, scanning the enriched samples by a terahertz time-domain spectroscopy system to obtain time-domain signal data of the blood samples;

step 3: preprocessing the time-domain signal data of the samples obtained from step 1 and step 2 to a THz spectral absorption coefficient curve of the samples;

step 4: matching the terahertz spectral absorption coefficient curves of blood samples obtained in step 3 with parameters of component concentration and component type of the blood lipid detected by hospital instruments, and establishing a terahertz blood lipid parameter database by combining the time-domain signal data of samples of the triglyceride and cholesterol obtained in step 1;

step 5: taking half of the data in the database as a training set and the other half of the data as a test set; determining parameters of a support vector regression (SVR) model; performing a training with the training set as input to the SVR model to obtain a support vector and a corresponding weight; testing the test set of an unknown blood sample using the trained support vector and the corresponding weight to obtain blood analysis results; and verifying accuracy of the trained support vector and the corresponding weight.

* * * * *